United States Patent [19]

Ortiz, Jr. et al.

[11] Patent Number: 5,054,877
[45] Date of Patent: Oct. 8, 1991

[54] MULTI-FIBER OPTICAL COUPLER FOR A HIGH POWER LASER BEAM

[75] Inventors: Angel L. Ortiz, Jr., Scotia, N.Y.; Tushar S. Chande, Pittsburgh, Pa.

[73] Assignee: General Electric Company, Schenectady, N.Y.

[21] Appl. No.: 189,074

[22] Filed: May 2, 1988

[51] Int. Cl.$^5$ .............................................. G02B 6/32
[52] U.S. Cl. ...................................... 385/33; 385/48
[58] Field of Search ............... 350/96.18, 96.20, 96.21

[56] References Cited

U.S. PATENT DOCUMENTS

| | | | |
|---|---|---|---|
| 4,263,495 | 4/1981 | Fujita et al. | 219/121 L |
| 4,564,736 | 1/1986 | Jones et al. | 219/121 L |
| 4,659,176 | 4/1987 | Mori | 350/96.18 |
| 4,676,586 | 6/1987 | Jones et al. | 350/96.20 |
| 4,681,396 | 7/1987 | Jones | 350/96.18 |
| 4,707,073 | 11/1987 | Kocher | 350/96.23 |
| 4,732,450 | 3/1988 | Lee | 350/96.18 |
| 4,732,452 | 3/1988 | Carter et al. | 350/96.21 |
| 4,749,250 | 6/1988 | Carter | 350/96.18 |
| 4,770,485 | 9/1988 | Buckley et al. | 350/96.18 |

OTHER PUBLICATIONS

"A Review of Optical Fiber Connection Technology" by J. F. Dagleish, Proc. of 25th Intl. Wire and Cable Symposium, Nov. 1976, pp. 206-218.
"Fusion Splices for Single-Mode Optical Fibers" by Hatakeyama et al., IEEE Journal of Quantum Electronics, vol. QE-14, pp. 213-218, Aug. 1978.

Primary Examiner—William L. Sikes
Assistant Examiner—Robert E. Wise
Attorney, Agent, or Firm—Paul R. Webb; James C. Davis, Jr.

[57] ABSTRACT

An optical fiber coupler for coupling a high power laser beam delivered by an incoming fiber into multiple outgoing fibers is disclosed. The beam emitted from the incoming fiber is collimated and split into multiple split beam portions for injection into the respective multiple outgoing fibers. Each split beam portion is shaped for injection into its respective outgoing fiber in accordance with specific beam injection criteria.

15 Claims, 8 Drawing Sheets

MULTI-FIBER OPTICAL COUPLER FOR A HIGH POWER LASER BEAM

The present invention is directed in general to fiber optic couplers and, more specifically, to a coupling device for efficiently coupling a fiber delivered high power laser beam into a plurality of optical fibers for continued transmission therethrough.

BACKGROUND OF THE INVENTION

High power laser beam as used herein refers to a laser beam having an average power ranging from approximately one watt to hundreds of watts. High power gas and solid state lasers are used extensively in manufacturing processes today because of cost savings and product quality improvements realized through their use. Due to the high capital costs of power lasers, however, one design objective to be achieved in implementing such a laser in a manufacturing system is to maximize the utilization of the power laser. In broadest terms, this requires making the power laser generated beam available to as many manufacturing functions as possible. A second design objective synergistic with the objective of maximizing laser utilization is to maximize the manufacturing system's flexibility to deliver the laser beam to the multiple, spatially separated process points where it is required on a manufacturing workpiece. One technique known in the art for providing such flexibility is to direct the laser beam through one end of an optical fiber so that the other end of the fiber may be moved between the multiple process points on the workpiece. Apparatus for the practice of such a technique is disclosed in commonly assigned U.S. Pat. No. 4,564,736.

In view of the above described flexibility afforded by fiber optic delivery of the high power laser beam, it would be desirable to provide apparatus for splitting the power laser beam and delivering the split beam portions through different multiple optical fibers each of which terminate at a different one of the workpiece process points. Given the flexibility of delivering the full power of the high power laser beam to the workpiece via an optical fiber, it would be further desirable to provide apparatus for coupling the beam delivered by that single fiber into the multiple fibers which terminate at the different workpiece process point locations.

There are at least two major techniques known in the art for coupling together multiple optical fibers to enable the laser beam transmitted through one incoming fiber to be coupled into the remaining outgoing fibers for continued transmission through those fibers. Each of these two techniques is, however, to the extent the inventors herein are aware, limited to communication and low power applications in which the laser beam average power is substantially less than one watt. In general, design considerations and different coupling techniques for coupling fibers transmitting low power laser beams are surveyed in the paper entitled "A Review of Optical Fiber Connection Technology" by Dalgleish, Proceedings of 25th International Wire and Cable Symposium, Nov. 1976, pp. 240–246. One of the major coupling techniques consists of using a connector. In one type of connector, the respective end portions of the fibers being coupled are each rigidly supported in respective connector fittings. In such connector fittings, each fiber end is typically supported within a metal or ceramic ferrule which is in turn supported within the fitting. The actual splitting of the incoming laser beam to enable coupling into multiple outgoing fibers occurs within a connector body. The body is typically adapted for screw engagement with each connector fitting to achieve appropriate alignment of each fiber end with the beam splitting apparatus within the connector body. Connectors exemplary of this type are manufactured by Dainichi-Nippon Cables, Ltd. of Tokyo, Japan. Such beam splitting connectors are not intended for nor adaptable to high power laser beam applications. Such connectors appear to rely on aligning of the fiber ends without any special conditioning of the laser beam split portions prior to their injection, for continued transmission, into the outgoing fibers. In the case where such a connector is being used to couple a high power laser beam, fiber misalignment will result in a stray portion of the beam impinging on a portion of the connector body, and/or a supporting ferrule, to cause heating. Such heating will at very least cause thermal distortion, if not physical damage, to the connector resulting in further misalignment. Additionally, as described in greater detail below and as known in the art, power laser beam injection into an optical fiber is most efficiently achieved where the beam is focussed onto the prepared fiber end in accordance with specific criteria. Thus, the mere alignment of fibers to achieve coupling therebetween is an extremely inefficient connection and one that is not feasible for the coupling of a high power laser beam.

The second major technique for coupling together multiple optical fibers consists of splicing techniques in which the multiple fibers being coupled are fused together. U.S. Pat. No. 4,263,495 to Fujita et al. discloses such a technique in which the fusing is achieved by irradiation of the multiple fibers with a $CO_2$ laser. Other techniques for such fusion, e.g. by use of an electric arc, are also known in the art. Such splicing techniques result in average splice losses that are apparently acceptable for communication or low power applications. However, the inventors herein believe that based on the dB losses indicated for such splices, transmission of a power laser beam through the splice would result in heat generation and subsequent failure of the splice.

It is therefore a principal object of the present invention to provide apparatus for splitting a high power laser beam, delivered by an incoming optical fiber, into a plurality of split beam portions and coupling those portions into a like plurality of outgoing fibers for continued transmission therethrough.

SUMMARY OF THE INVENTION

In accordance with the present invention there is provided apparatus for coupling into a plurality of outgoing optical fibers a high power laser beam delivered through an incoming optical fiber. The apparatus includes elements for splitting the power laser beam emitted from an end of the incoming fiber into a plurality of split beam portions equal in number to the plurality of outgoing fibers. The coupling apparatus further includes lenses for optically shaping the plurality of split beam portions for respective injection into the ends of the outgoing fibers. The respective ends of the incoming and outgoing fibers are prepared in advance for fiber coupling. The optical shaping performed by the shaping lenses results in each split beam portion being focussed as a spot onto a respective one of the outgoing fiber ends for injection therein such that the focussed portion of the shaped beam has an entry cone angle that is less than two times an angle corresponding to a numerical aperture of the outgoing fiber and a focussed spot size with a diameter that is less than the diameter of a core portion of the outgoing fiber. The coupling apparatus also includes structure for mounting the shaping lenses and beam splitting elements in alignment with the incoming and outgoing fiber ends so that the power laser beam emitted from the incoming fiber end is split into the plurality of split beam portions which are respectively shaped and injected into the ends of the plurality of outgoing fibers for continued transmission through the outgoing fibers.

In accordance with a first embodiment of the present invention, the beam splitting elements comprise a lens for collimating as a first collimated beam portion the beam emitted from the incoming fiber end. Also in accordance with the first embodiment, the splitting elements further comprise at least one beam splitter for splitting the first collimated beam portion into the plurality of split beam portions which are optically shaped for injection into the outgoing fibers.

A second embodiment of the present invention differs from the first embodiment in that the shaping lenses include lenses for optically expanding, prior to focussing, at least one of the split beam portions into a second collimated beam portion having a larger beam diameter than the first collimated beam portion. As a result, a beam divergence of the second collimated beam portion is smaller than a beam divergence of the first collimated beam portion, so that the second collimated beam portion can be focussed on the outgoing fiber end to a smaller focused spot diameter corresponding to the smaller divergence of the second collimated beam portion.

In accordance with a third embodiment of the present invention, the beam splitting elements include a lens for collimating as a first collimated beam portion the beam emitted from the incoming fiber end. Also in accordance with the third embodiment, the splitting elements include lenses for optically expanding the first collimated beam portion into a second collimated beam portion having a larger beam diameter than the first collimated beam portion and at least one beam splitter for splitting the second collimated beam portion into the plurality of split beam portions.

In accordance with a fourth embodiment of the present invention, the beam splitting elements comprise a lens for collimating as a first collimated beam portion the beam emitted from the incoming fiber end and a first beam splitter for splitting the first collimated beam portion into a predetermined number of second collimated beam portions. The coupler of the fourth embodiment also comprises lenses for optically expanding a selected one of the second collimated beam portions into a third collimated beam portion having a larger beam diameter than the second collimated beam portion. The fourth embodiment coupler additionally comprises a second beam splitter for splitting the third collimated beam portion into a predetermined number of fourth collimated beam portions. Each non-selected second collimated beam portion and each fourth collimated beam portion comprise the plurality of split beam portions which are shaped for injection into the outgoing fibers. The shaping lenses of the fourth embodiment coupler can include additional lenses for optically expanding at least one of the non-selected second collimated beam portions into a fifth collimated beam portion having a larger diameter than the second collimated beam portion and a plano-convex lens for focussing the fifth collimated beam portion onto the end of a corresponding one of the outgoing fibers.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIGS. 1a, 1b and 1c illustrate an optical fiber coupler constructed in accordance with a first embodiment of the present invention;

DESCRIPTION OF THE INVENTION

Figures 1A, 1B:
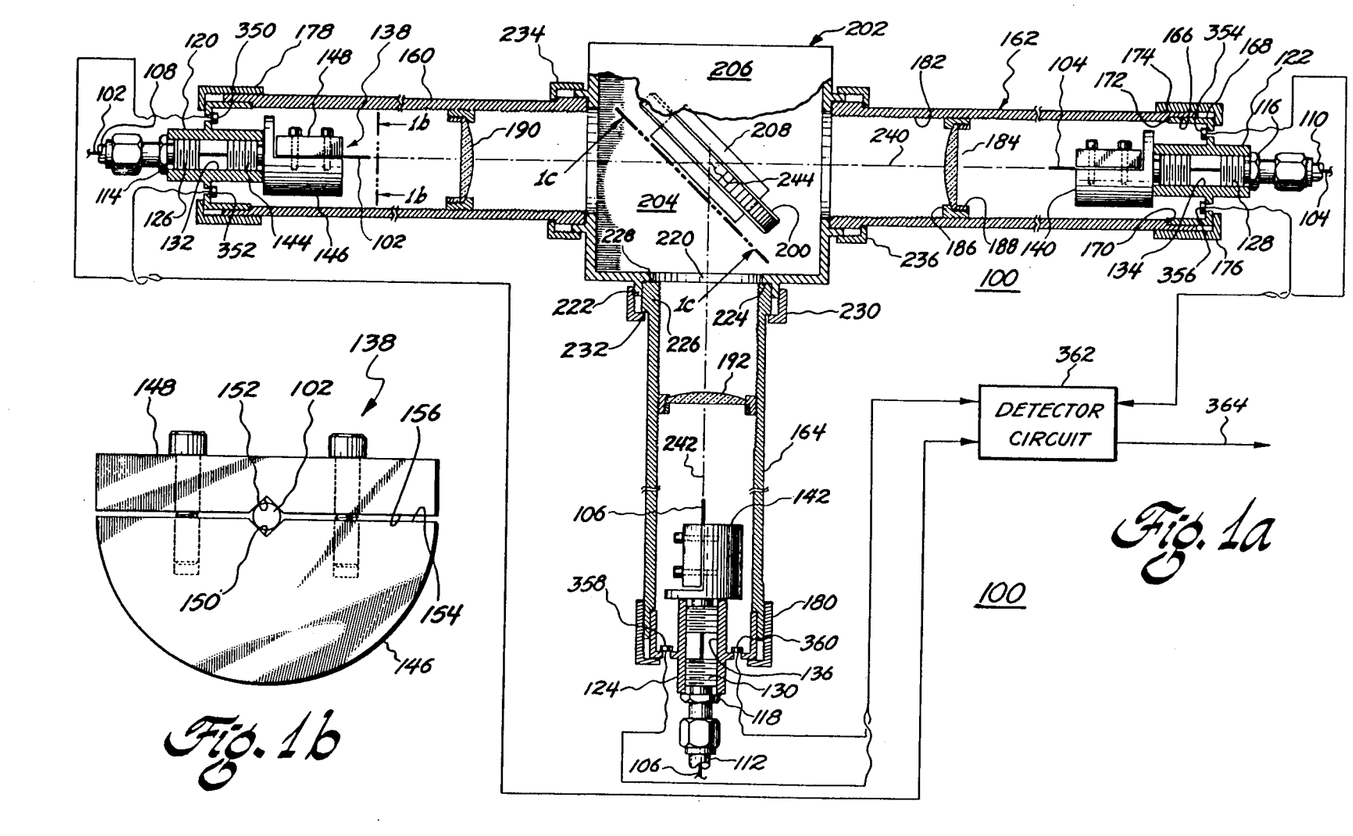

Referring now to the drawings, FIG. 1a illustrates an optical fiber coupler 100, for coupling the power laser beam received through an incoming fiber 102 into two outgoing fibers 104 and 106, constructed in accordance with a first embodiment of the present invention. Fibers 102, 104 and 106, which need not be of the same diameter, are respectively enclosed in protective polyethylene tubing 108, 110 and 112, the practice of using such tubing being preferred by the instant inventors but not essential to the practice of the present invention. For the transmission of a high power laser beam, all three fibers 102, 104, and 106 are preferably of the step-index type. Fibers 102, 104 and 106 are respectively introduced into coupler 100 through connectors 114, 116 and 118 which are mounted in end brackets 120, 122 and 124 of the coupler. Each connector 114, 116 and 118 includes a threaded male portion 126, 128 and 130, respectively, which matingly screws into an interior threaded portion 132, 134 and 136 of its respective end bracket. Each of the connectors serves to rigidly grasp the polyethylene tubing containing the fiber passing therethrough. The tubing is terminated within the connector body so that only the fiber emanates therefrom. Each connector may be provided as a tube fitting such as a model FH4BZ thermocouple connector manufactured by the Instrumentation Connectors Division of the Parker-Hannifin Corporation of Huntsville, Ala. Comparable connectors are also available as Swagelok tube fittings manufactured by the Crawford Fitting Company of Solon, Ohio.

The fiber emanating from each connector 114, 116 and 118 is next supported in a split fiber holder 138, 140 and 142, respectively. Since the three fiber holders are identical, only holder 138 will be described in detail. FIG. 1b illustrates an end view of holder 138 as viewed along the section line 1b—1b shown in FIG. 1a. Holder 138 includes a neck portion 144 threaded for screw engagement with interior portion 132 of bracket 120. The neck portion also includes a hollow bore of sufficient diameter to allow the free passage therethrough of fiber 102. Neck portion 144 is contiguous with a base portion 146 which includes four threaded holes three of which are visible in FIGS. 1a and 1b. A cap 148 includes four holes which register with the holes in the base portion when the cap is mounted in place. The base portion and cap respectively include axial grooves 150 and 152 for receiving fiber 102. The respective grooves have a depth selected such that with fiber 102 in place, opposing faces 154 and 156 of the base portion and cap, respectively, do not make contact. Bolts are passed through the holes in the cap and screw tightened into the threaded holes of the base portion to compress fiber 102 within grooves 150 and 152 between the base portion and cap and thereby rigidly support the fiber against movement. It is noted that through loosening and retightening of the bolts, axial adjustment of the end of the fiber held within the fiber holder is possible. Each fiber is preferably axially positioned within its respective holder such that the free end of the fiber extends beyond the holder, e.g. by a distance of approximately one inch. Each fiber holder is preferably fabricated of fused quartz in order to be transparent to laser energy and thereby avoid heating or damage that would otherwise be caused by inadvertent impingement thereon of such laser energy. If the laser energy is sufficiently low or the inadvertent laser impingement is not otherwise a concern, the fiber holder can be fabricated of other materials, e.g. plexiglass.

Coupler 100 further comprises three cylindrically shaped barrel portions 160, 162 and 164. The three barrel portions are configured substantially identically although their respective diameters may differ in order to accommodate different lens diameters. Since the three barrel portions 160,162,164 are configured substantially identically, only portion 162 will be described in detail. Barrel 162 includes a smooth cylindrical bore portion 166 for receiving with a tight slip fit a smooth exterior cylindrical surface 168 of end bracket 122. The barrel further includes a shoulder 170 against which a shoulder 172 of bracket 122 seats when coupler 100 is fully assembled. Barrel portion 162 further includes an external threaded portion 174 for engagement with a threaded end cap 176. Cap 176 is screwed down against end bracket 122 to cause the seating of shoulders 172 against shoulder 170 and to rigidly hold the end bracket in that seated position. Barrel portions 160 and 164 thus include threaded end caps 178 and 180 to respectively hold end brackets 120 and 124 in place when coupler 100 is fully assembled.

Barrel portion 162 additionally includes an internal threaded portion 182 which extends to the end of the barrel remote from end bracket 122. The interior of the barrel is so threaded to enable the mounting therein of a plano-convex lens 184. Lens 184 is mounted in a mounting ring 186 and retained in the mounting ring by a retaining ring 188. The mounting ring is externally threaded for engagement with barrel internal threaded portion 182. It is preferred herein that a locking ring (not shown), externally threaded for engagement with barrel threaded portion 182, be screwed into the barrel and tightened against mounting ring 186 in order to lock the mounting ring against movement. The locking ring would have a clear aperture at least equal to the lens diameter. Barrel portions 160 and 164 are each provided with internal threading as within barrel 162 to enable plano-convex lenses 190 and 192 to be respectively mounted in those barrel portions in the same manner as described for barrel portion 162. The screw engagement between each mounting ring and barrel enables accurate axial positioning of each lens along its respective barrel portion.

Coupler 100 also includes a beam splitter 200 which is mounted within a rectangular enclosure 202. The enclosure, as viewed in FIG. 1a, includes a base 204 and a cover 206. Referring also to FIG. 1c which is section 1c—1c of FIG. 1a, splitter 200 is illustrated as a plate type beam splitter having a circular cross section. As can be seen, a support block 208 is mounted on the surface of enclosure base 204 to support the splitter in a groove sized to receive the splitter. A support block 210 also having a groove sized to receive the splitter rests atop the splitter. Cover 206 includes a threaded hole 212 to receive a threaded screw 214 for tightening against block 210. Thus, with cover 206 secured to enclosure 202, e.g. by bolts not shown, screw 214 may be tightened to secure splitter 200 against movement.

Enclosure 202 is configured to have rigidly attached thereto the three barrel portions 160, 162 and 164. Since the three barrel portions are attached to the enclosure in identical fashion, only the attachment of barrel portion 164 will be described in detail. Enclosure 202 includes a preferably circular opening 220 providing a clear aperture at least equal to the inside diameter of barrel portion 164. The exterior surface of enclosure 202 includes a cylindrical externally threaded flange 222 which is set back from opening 220 to establish a seating surface 224. Barrel portion 164 includes (as do barrel portions 160 and 162) a shoulder 226 at the end thereof. Shoulder 226 has an outside diameter selected to provide a tight sliding fit within flange 222 and a seating surface 228 for abutment with surface 224. Barrel portion 164 is secured to enclosure 202 by the screw engagement between an internally threaded cap 230 and flange 222 and the tightening of that cap against a surface 232 of shoulder 226. Threaded caps 234 and 236 are provided to respectively attach barrel portions 160 and 162 to enclosure 202 in the same manner as for cap 230 and barrel portion 164.

Coupler 100 is fabricated such that, with the end brackets mounted in their respective barrel portions and fibers 102, 104 and 106 supported therein, a predetermined desired alignment is achieved. The axes of the end portions of fibers 102 and 104 projecting beyond the ends of their respective fiber holders are coaxial along an axis 240. Further, fiber 106 is supported in its fiber holder such that the axis of the fiber end portion thereof lies along an axis 242 which is perpendicular to axis 240. Additionally, the axes of lenses 184 and 190 are coaxial with axis 240 and the axis of lens 192 is coaxial with axis 242. With the coupler fully assembled, barrel portions 160 and 162 are preferably coaxial with axis 240 while barrel portion 164 is preferably coaxial with axis 242. Support blocks 208 and 210 are oriented to cause the mounting of splitter 200 such that its major surfaces intersect axes 240 and 242 at a 45° angle. The splitter is further oriented such that a longitudinal axis 244 thereof, which is parallel to the major faces of the splitter, is mutually orthogonal with axes 240 and 242. It is noted that in view of the construction of coupler 100, only axial adjustment of the lenses and fiber ends are possible. Aside from this adjustment capability, the alignments required to achieve successful coupling between the incoming and outgoing fibers is dependent on the precise construction of coupler 100 and the rigid support of the lenses, fibers and splitter therein. The barrel portions, end brackets, splitter enclosure and various threaded caps of coupler 100 may be fabricated from a material such as aluminum.

Figure 2:
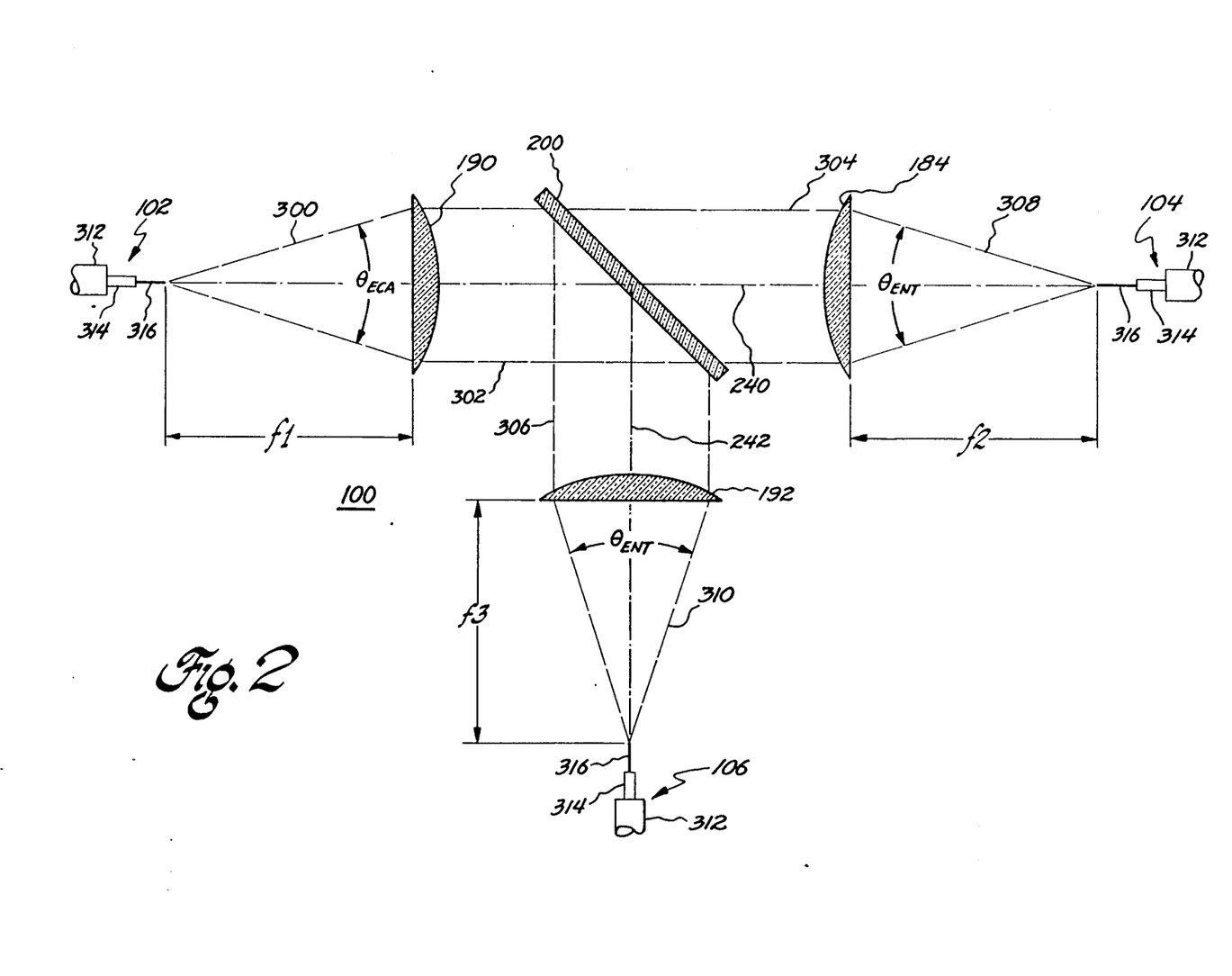
FIG. 2 schematically illustrates the lenses contained in the coupler illustrated in FIGS. 1a, 1b and 1c in order to better show the relative positions of the lenses therein and optical fibers being coupled.

Referring now to FIG. 2, the relative positions of the respective lenses and fibers illustrated in FIG. 1 are described in greater detail. For clarity, FIG. 2 only illustrates fibers 102, 104 and 106; lenses 184, 190 and 192; and splitter 200. In accordance with the first embodiment of the present invention, the power laser beam delivered through incoming fiber 102 emanates from the end thereof as a diverging beam portion 300 and is collimated by lens 190 into a collimated beam portion 302. The collimated beam portion, which is coaxial with axis 240, falls incident on splitter 200 and is split thereby into two collimated split beam portions 304 and 306. The two split beam portions 304 and 306 have the same diameter as beam portion 302, due to the 45° orientation of splitter 200, and are respectively focussed by lenses 184 and 192 into focussed beam portions 308 and 310. Focussed beam portions 308 and 310 are respectively focussed as spots on the ends of fibers 104 and 106 for injection into and continued transmission through those fibers. In order to achieve the efficient injection of the power laser beam into fibers 104 and 106, various criteria must be met. Since in coupler 100 all elements are substantially rigidly mounted with only axial adjustments of the lenses and fiber ends possible, the end portions of fibers 102 and 104 and the axes of lenses 184 and 190 are coaxial and lie along axis 240. Additionally, the end portion of fiber 106 and the axis of lens 192 will be coaxial and lie along axis 242 perpendicular to axis 240. Each lens 184,190,192 and splitter 200 are preferably fabricated of fused quartz to withstand, without breaking, the heat generated by impingement thereon of the power laser beam being transmitted. Further, each lens and the beam splitter are coated with a narrow wavelength band anti-reflection coating selected to maximize transmissivity of the wavelength of the power laser beam being transmitted. Such coatings are well known in the art and optical elements so coated are available from CVI Laser, Inc. of Albuquerque, New Mexico. Another criterion for efficient beam injection is suitable preparation of the respective ends portions of fibers 102, 104 and 106. Such end preparation is described in commonly assigned U.S. Pat. Nos. 4,564,736 and 4,676,586 respectively entitled "Industrial Hand Held Laser Tool and Laser System" and "Apparatus and Method for Performing Laser Material Processing Through a Fiber Optic" which are incorporated in their entirety herein by reference. The appropriate end preparation, not illustrated in FIG. 1, is shown diagrammatically in FIG. 2 for each fiber 102, 104 and 106. Those fibers are each assumed to have a three layer structure typical of step-index type fibers. Thus with respect to those fibers, the successive portions 312, 314 and 316 of each fiber respectively correspond to the fiber with jacket, fiber without jacket but with cladding exposed and fiber with the bare core exposed without cladding.

Other fibers known in the art that are suitable for high power laser beam transmission and for practice with the present invention may have different layered structures. Such fibers would be subjected to end preparation in a manner analogous to that taught in the above incorporated patents. It is noted that while in the above incorporated patents end preparation is described with respect to a fiber into which a power laser beam is being injected, it is preferred herein that the fiber from which the beam emanates, i.e. fiber 102, also be prepared in the same fashion. This is done to assure that a uniformly conical beam emanates from the end of that fiber and, further, that the emanating beam does not cause burning of the fiber 102 cladding or jacket.

Lens 190 which collimates the beam has a focal length f1 and is positioned at the distance f1 from the end of fiber 102. The selection of f1 therefore depends on the emitted cone angle ($\theta_{ECA}$) with which beam portion 300 emanates from fiber 102 and the desired diameter of collimated beam portion 302. As described hereinbelow, the sizes of the focussed spots on the ends of fibers 104 and 106 depend in part on focal length f1. The above incorporated patents as well as commonly assigned U.S. Pat. No. 4,681,396 entitled "High Power Laser Energy Delivery System", which is incorporated in its entirety herein by reference, describe the criteria for efficient injection of a power laser beam into the prepared fiber end. These criteria include the focussed spot size being less than the diameter of the fiber core and the entry cone angle ($\theta_{ENT}$ in FIG. 2) being less than two times the angle corresponding to the numerical aperture of the fiber. These criteria determine the selection of the focal lengths f2 and f3 of lenses 184 and 192, respectively, which focus the split beam portions onto the ends of fibers 104 and 106. Thus, each lens 104 and 106 is positioned a distance f2 and f3, respectively, from the fiber 104 and 106 ends.

The beam quality of the beam emitted from fiber 102, designated BQ1, is approximately given by:

$$BQ1 = d1 \times \theta_{ECA} \tag{1}$$

where d1 is the diameter of the core of fiber 102 and $\theta_{ECA}$ (shown in FIG. 2) is the cone angle of the emitted beam. The beam diverges to the diameter $D_{COL1}$ of collimated beams 302, 304 and 306, so that $\theta_{ECA}$ can be expressed as:

$$\theta_{ECA} = \frac{D_{COL1}}{f1} \tag{2}$$

This expression for $\theta_{ECA}$ can be substituted into equation (1) to provide the following expression for BQ1:

$$BQ1 = d1 \times \frac{D_{COL1}}{f1} \tag{3}$$

Injection into fiber 104 is considered first. The beam quality of focussed beam portion 308, designated BQ2, can be expressed as:

$$BQ2 = \frac{D_{COL1} \times S_{104}}{f2} \tag{4}$$

where $S_{104}$ is the diameter of the focussed spot on the end of fiber 104. Solving equation (4) for the spot size yields:

$$S_{104} = \frac{BQ2 \times f2}{D_{COL1}} \quad (5)$$

As is well known in the art, however, the beam quality of beam quality of the beam focussed onto the end of fiber 104, i.e. BQ1=BQ2. Therefore, the expression for BQ1 in equation (3) is substituted for BQ2 in equation (5) to provide:

$$S_{104} = d1 \times \frac{f2}{f1} \quad (6)$$

Thus for a given diameter d1 of fiber 102, it is necessary to select the respective focal lengths of lenses 190 and 184 such that the focal length ratio f2/f1 yields a focussed spot size smaller than the diameter of the fiber 104 core. As noted above, this focal length selection must also be made subject to the constraint that f2 provides an entry cone angle that is less than two times the angle corresponding to the numerical aperture of the fiber 104. In similar fashion, the diameter $S_{106}$ of the beam spot as focussed by lens 192 on the end of fiber 106 is computed to be:

$$S_{106} = d1 \times \frac{f3}{f1} \quad (7)$$

It is therefore also necessary to select the focal length f3 of lens 192 in order to assure the beam injection criteria are met for fiber 106. It is noted that, subject to the above described beam injection criteria and equations (6) and (7), the diameter of the fiber 102 core may be less than, equal to or greater than the respective diameters of the fiber 104 and 106 cores. In general, the laser beam diameters referred to herein are defined as a diameter at which the beam intensity drops to $1/e^2$ of the peak beam intensity, where "e" is the base of the Napierian logarithmic system.

As is known in the art, beam splitters such as splitter 200 are available to provide a 50%/50% splitting ratio resulting in an equal apportionment of the energy in beam portion 302 between split portions 304 and 306. In such a case, the energy of the laser being transmitted through incoming fiber 102 is evenly divided between outgoing fibers 104 and 106. However, beam splitters may also be fabricated to provide an arbitrarily prescribed splitting ratio for apportioning the laser energy incident thereon between the split beam portions. For example, splitter 200 may be fabricated to provide 75% of the beam portion 302 energy in split portion 304 and 25% of the energy in portion 306, resulting in an approximate 3-to-1 split of laser energy resulting between fibers 104 and 106. The above noted CVI Laser, Inc. of Albuquerque, New Mexico can provide beam splitters with arbitrarily prescribed energy apportionment.

As an optional feature, coupler 100 may be provided with a plurality of devices, such as photodiodes, for detecting the radiation intensity level proximate each fiber end. Referring again to FIG. 1a, optional photodiodes 350 and 352 are shown mounted on end bracket 120. Similarly, photodiodes 354 and 356 are mounted on bracket 122 and photodiodes 358 and 360 are mounted on bracket 124. The photodiodes would preferably have selective sensitivity to the wavelength of the power laser beam being transmitted. For example, for a neodymium doped yttrium-aluminum-garnet (Nd:YAG) laser, each photodiode may be provided as a model no. OSI5L photodiode manufactured by Centronics Corporation of Mountainside, New Jersey. The radiation intensity level information provided by the photodiodes can be utilized for a number of purposes. With respect to photodiodes 350 and 352, proximate the fiber 102 end, an increase in detected intensity level relative to a reference level corresponding to normal coupler operation, may indicate damage to the tip of fiber 102. For example, the end of fiber 102 is required to be planar and perpendicular to the fiber axis, in accordance with the above incorporated patents directed to fiber end preparation. If the end of fiber 102 loses that shape, the beam cone emitted from that fiber end would have an irregular shape which may result in some portion of the emitted beam impinging on the interior of barrel 160 and reflecting back onto the photodiodes. The photodiodes would therefore detect an increase in radiation intensity level. As a further example, beam impingement on the barrel could also occur due to axial misalignment of fiber 102. With respect to photodiodes 354, 356, 358 and 360, an increase in detected intensity level, proximate the fiber 104 or 106 ends, relative to a normal level corresponding to efficient beam injection into the fiber end would serve to indicate improper beam injection due to fiber misalignment or damage of the fiber end. In FIG. 1a, an electrical lead from each photodiode is brought out of coupler 100 and into a detector circuit 362. Circuit 362 includes circuitry to monitor the signals provided by the respective photodiodes in order to detect an increase in radiation level relative to a reference level and provide a signal on an output 364 upon detecting such an increase. The signal so provided on output 364 could be used to shut down the laser generating the power laser beam being coupled through coupler 100. An exemplary construction of detector circuit 362 is disclosed in commonly assigned, allowed U.S. patent application Ser. No. 010,657, now U.S. Pat. No. 4,739,162 which is incorporated in its entirety herein by reference. With the detected radiation levels of the six photodiodes available, additional circuitry could be provided within circuit 362 to monitor the difference between the radiation levels detected proximate the fiber 102 end and the fiber 104 and 106 ends. This difference represents the losses normally experienced in transmitting the laser beam through the lenses and splitter and injecting the split beam portions into fibers 104 and 106. Detection of a larger radiation level difference would serve to indicate possible damage to one or more lenses or the splitter. Circuitry to monitor this radiation level difference is within the skill of the art.

In operation, with the optical fiber coupler of the first embodiment provided as illustrated in FIGS. 1a, 1b, 1c and 2, the power laser beam (e.g. such as generated by a Nd:YAG laser) delivered through fiber 102 is emitted from the end thereof and collimated by lens 190. The collimated beam portion 302 is split by beam splitter 200 into the split portions 304 and 306 which are respectively focussed onto the ends of fibers 104 and 106 by lenses 184 and 192. Lenses 190, 184 and 192 are selected such that the beam focussed portions meet the above described entry cone angle and spot size criteria and the split beam portions are successfully injected into fibers 104 and 106 for continued transmission through those fibers.

Figure 3:
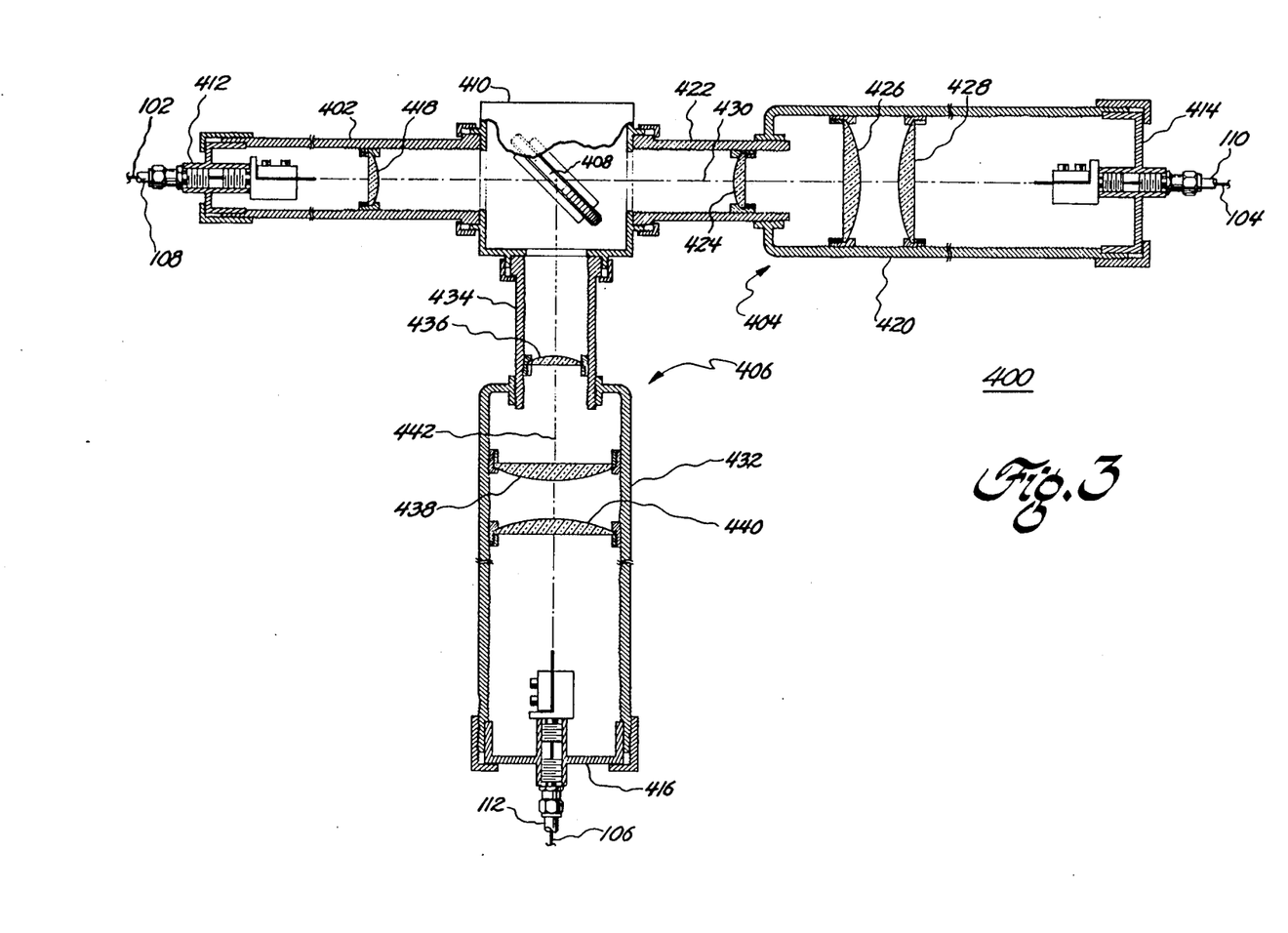
FIG. 3 illustrates an optical fiber coupler constructed in accordance with a second embodiment of the present invention.
Figure 4:
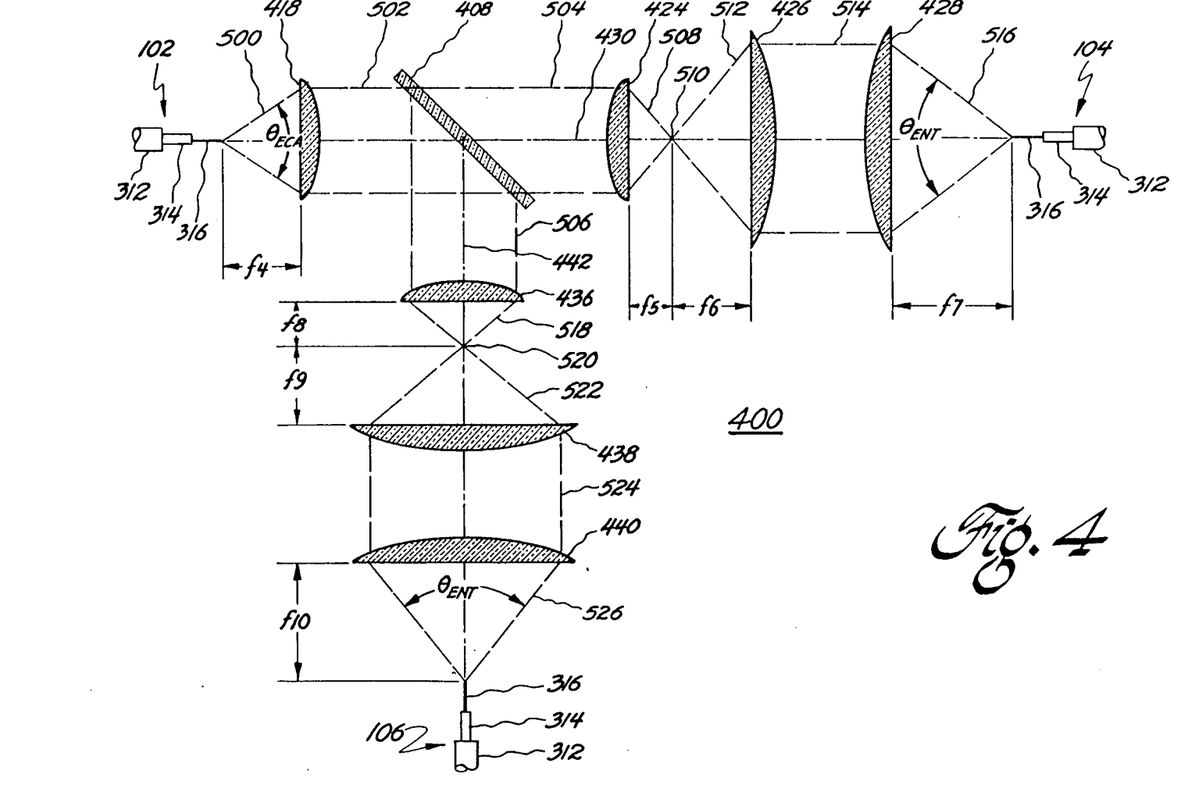
FIG. 4 schematically illustrates the lenses contained in the coupler illustrated in FIG. 3 in order to better show the relative positions of the lenses therein and optical fibers being coupled.

In accordance with the above equations, it was noted that it is necessary to select the lens focal lengths to achieve the required focussed spot size while also satisfying the entry cone angle criterion. Given certain combinations of beam quality of the beam emitted from fiber 102 and respective fiber diameters to be coupled, it may be impossible to select values of f1, f2 and f3 that enable coupling of the three fibers in accordance with the first illustrated embodiment of the present invention. In such a case, it would be necessary to construct the optical fiber coupler in accordance with a second embodiment of the present invention which is illustrated in FIGS. 3 and 4. FIG. 3 illustrates an optical fiber coupler 400 constructed in accordance with the second embodiment. As in the case of coupler 100, coupler 400 serves to couple the power laser beam transmitted through incoming fiber 102 into the two outgoing fibers 104 and 106. Fibers 102, 104 and 106 are again illustrated as initially contained within polyethylene tubing 108, 110 and 112. Coupler 400 includes three cylindrically shaped barrel portions 402, 404 and 406 and a beam splitter 408 contained within an enclosure 410. The three fibers 102, 104 and 106 are supported in end brackets 412, 414 and 416, respectively, within barrel portions 402, 404 and 406 in the same manner as they were supported in coupler 100. As a result, the details of the support structure will not be described again here. Similarly, barrel portions 402, 404 and 406 are attached to the beam splitter enclosure in the same manner as described for coupler 100 and the details of that attachment will not be described again here. Barrel portion 402 has a single plano-convex lens 418 mounted within an interior threaded portion thereof, in the same manner as the lenses mounted in coupler 100, such that axial adjustment of the lens position is possible. Barrel portion 404 comprises a large bore portion 420 and a small bore portion 422, the latter being attached to splitter enclosure 410 in the manner described above. The small bore portion has a single plano-convex lens 424 mounted therein while the large bore portion has two plano-convex lenses 426 and 428 mounted therein. The small and large bore portions are joined together by threaded engagement. The three lenses mounted in barrel portion 404 are all mounted within interior threaded portions of the barrel, in the manner described for coupler 100, to enable their axial adjustment. Further, barrel portions 402 and 404 and the lenses mounted therein are mounted relative to one another such that the end portions of fibers 102 and 104 are coaxial, about an axis 430, with one another and with the respective axes of the lenses. The barrel portions themselves are also preferably coaxial about axis 430.

Barrel portion 406 comprises a large bore portion 432 and a small bore portion 434, the latter being attached to enclosure 410 in the manner described above. A plano-convex lens 436 is mounted within small bore portion 434 while two plano-convex lenses 438 and 440 are mounted within large bore portion 432. The three lenses within barrel portion 406 are all mounted within interior threaded portions of that barrel portion. The small and large bore portions are joined together by threaded engagement. The respective axes of lenses 436, 438 and 440 and the end portion of fiber 106 are mounted to be coaxial with one another about an axis 442. Barrel portion 406 is preferably constructed to also be coaxial about axis 442. Coupler 400 is constructed so that axis 442 is perpendicular to axis 430. Splitter 408, which is of the same type as splitter 200, is supported within enclosure 410 in the same manner as described hereinabove for splitter 200 within enclosure 202. Thus, the major faces of the splitter are oriented at a 45° angle to axes 430 and 442 and a splitter axis (not shown) parallel to those faces is mutually orthogonal to axes 430 and 442.

FIG. 4 illustrates, for clarity, only the end portions of fibers 102, 104 and 106 and the lenses of coupler 400. As in FIG. 2, the end preparation of each fiber is illustrated as consisting of the above described portions 312, 314 and 316. In accordance with the second embodiment of the present invention, the power laser beam delivered through incoming fiber 102 emanates from the end thereof as a diverging beam portion 500 and is collimated by lens 418 into a collimated beam portion 502. That collimated beam portion is split by beam splitter 408 into two collimated split portions 504 and 506 each having substantially the same diameter as collimated portion 502. Collimated portion 504 is applied to lens 424 which focuses the beam as a focussed portion 508 onto its focal point 510. The beam diverges beyond focal point 510 into an expanding beam portion 512 which falls incident on lens 426. That lens collimates beam portion 512 into a collimated beam portion 514 which has a larger diameter than collimated beam portion 504. Lens 428 focuses collimated beam portion 514, into a focussed portion 516, as a focussed spot on the end of fiber 104 for efficient injection into that fiber and continued transmission of split portion 504 of the power laser beam through fiber 104. In similar fashion, collimated portion 506 is focussed as a focussed portion 518 by lens 436 onto the lens focal point 520. Beyond the focal point, the beam expands as an expanding portion 522 which falls incident on lens 438 which serves to collimate the expanding beam portion into a collimated beam portion 524. The latter collimated beam portion has a larger beam diameter than collimated portion 506. Finally, lens 440 focuses collimated beam portion 524, into a focussed portion 526, as a focussed spot on the end of fiber 106 for efficient injection into that fiber. Split portion 506 of the power laser beam thereby continues transmission through fiber 106. As was the case with coupler 100, the elements of coupler 400 are rigidly mounted with respect to one another to achieve the above described alignments that enable efficient injection of the split portions of the power laser beam into fibers 104 and 106. Also as for coupler 100, the lenses and splitter of coupler 400 are preferably fabricated of fused quartz and provided with the above described narrow band coating.

The selection of the respective focal lengths and positioning of the lenses of coupler 400 is described next. As indicated above, in order to select lens focal lengths effective to meet the spot size and entry cone angle criteria for successful beam injection, a plurality of parameters must be considered. Lens 418 for collimating the emitted beam has a focal length f4 and is positioned the distance f4 from the end of fiber 102. As described with respect to the selection of the collimating lens focal length for coupler 100, selection of f4 depends on the emitted cone angle, $\theta_{ECA}$, with which the beam emanates from fiber 102 and the desired diameter of collimated beam portion 502. As can be seen, each split beam portion 504 and 506 encounters the same arrangement of lenses. As a result, the concepts underlying the selection and arrangement of the lenses encountered by split beam portion 504 will be described in detail, it being understood that the same concepts underlie the selection and arrangement of the lenses encountered by split beam portion 506. Lens 424 has focal length f5. Lens 426 has focal length f6 and is spaced a distance equal to the sum of f5 and f6 from lens 424. Lens 426 is positioned to intercept the diverging beam beyond the focal point of lens 424 and serves to collimate the diverging beam into collimated portion 514 which has a larger diameter than collimated portions 502 and 504. Together, lenses 424 and 426 therefore serve to expand collimated beam portion 504 into collimated beam portion 514. As will be further described below, the ratio of focal lengths f6/f5 is referred to as the beam expansion factor and represents the increase in diameter from collimated portion 504 to collimated portion 514. Lens 428 has a focal length f7 and is therefore spaced a distance f7 from the end of fiber 104 onto which it focuses beam portion 516. Following an equations (1)–(7), the following equation (8) can be derived to express the spot size diameter focussed by lens 428 onto the end of fiber 104:

$$S_{104} = d1 \times \frac{f7}{f4} \times \frac{1}{f6/f5} \tag{8}$$

where d1 is the diameter of the core of fiber 102. As can be seen from equation (8), the spot size $S_{104}$ is inversely proportional to the beam expansion factor, so that coupler 400 provides the flexibility of selecting lenses 424 and 426 to achieve an expansion factor that provides an acceptable spot size. Further, such a selection can be made in conjunction with the selection of lens 428 with a focal length f7 that enables meeting the entry cone angle ($\theta_{ENT}$) criterion. Thus, the advantage provided by the arrangement of lenses encountered by each split beam portion, in accordance with the second embodiment of the present invention, is the ability to expand the laser beam to achieve an acceptable spot size irrespective of the relative sizes of the fibers being coupled and the beam quality of the transmitted beam. It is noted that if the expansion factor f6/f5 is selected equal to 1, no expansion results and the spot size provided by equation (8) is the same as provided by equation (6) which is descriptive of the first embodiment. Since the same arrangement of lenses is encountered by split beam portion 506 as by split portion 504, the following equation (9) is descriptive of the focussed spot size $S_{106}$ on the end of fiber 106:

$$S_{106} = d1 \times \frac{f10}{f4} \times \frac{1}{f9/f8} \tag{9}$$

where f8, f9 and f10 are the respective focal lengths of lenses 436, 438 and 440.

An alternative way of viewing the desirable result achieved by expanding the laser beam within coupler 400 is by way of the following alternate expression for the focussed spot size diameter $S_{104}$ on the end of fiber 104:

$$S_{104} = f7 \times \theta_{D2} \tag{10}$$

where $\theta_{D2}$ is the divergence of beam collimated portion 514. As is well known in the art, a collimated beam which is expanded maintains its beam quality which is the product of its diameter and divergence. Thus, expanding the collimated beam within coupler 400 serves to increase its diameter and decrease its divergence. As seen from equation (10), it is desirable to decrease the divergence of beam portion 514 since this serves to decrease the spot size diameter. As a result, lenses 424 and 426 serve to expand collimated beam portion 504 into collimated beam portion 514 which has a larger diameter and smaller divergence, so that lens 428 can achieve a smaller focussed spot size diameter corresponding to the smaller divergence of beam portion 514.

In the operation of coupler 400 illustrated in FIGS. 3 and 4, the beam emitted from the end of incoming fiber 102 is collimated by lens 418 and the collimated beam 502 is split by splitter 408 into split beam portions 504 and 506. Split portion 504 undergoes expansion through lenses 424 and 426 to expanded collimated beam 514 which has a larger diameter and small divergence than collimated beam portion 504. The expanded beam is then focussed by lens 428 for injection into and continued transmission through fiber 104. In similar fashion, split beam portion 506 undergoes expansion, through lenses 436 and 438, into expanded collimated beam portion 524. The latter beam portion has a larger diameter and smaller divergence than split portion 506. Collimated beam portion 524 is focussed by lens 440 onto the end of fiber 106 for injection into that fiber and continued transmission therethrough. Optionally, coupler 400 can be provided with photodiodes (not shown in FIGS. 3 and 4) in the manner and for the purpose described above with respect to coupler 100.

Figure 5:
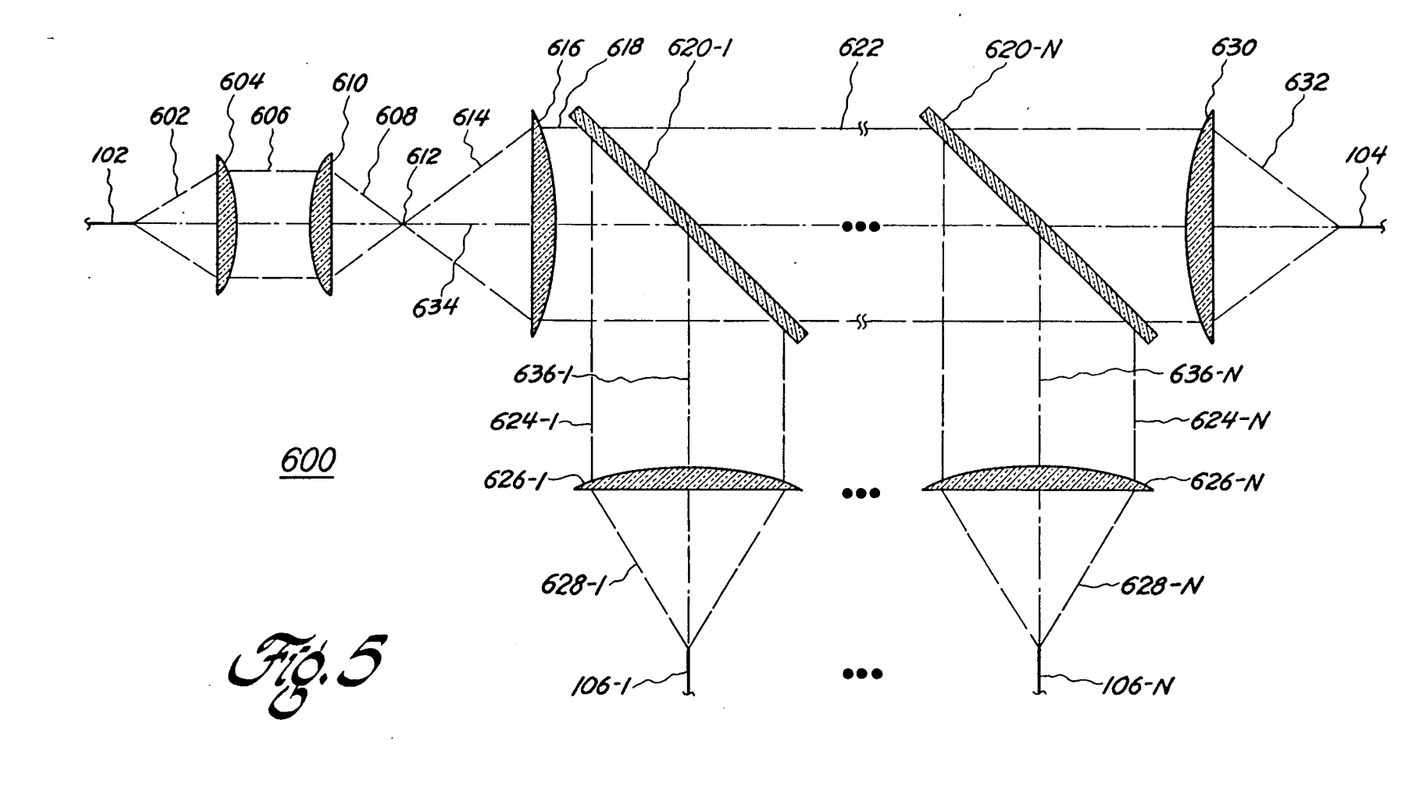
FIG. 5 schematically illustrates an optical fiber coupler constructed in accordance with a third embodiment of the present invention.

The advantages of expanding the collimated laser beam to meet the beam injection criteria have been described with respect to the second embodiment of the present invention in which the split portions of the collimated beam are each expanded before focussing for injection. The invention is, however, not so limited. In accordance with a third embodiment of the present invention, illustrated in FIG. 5, the laser beam is expanded before splitting to thereby obviate the need for the separate expansion of each split beam portion. FIG. 5 illustrates only the lenses and the beam splitters of a coupler 600 constructed in accordance with the third embodiment of the present invention, it being understood that the detailed construction of coupler 600 will be readily apparent to those skilled in the art in view of the illustrations and description hereinabove of couplers 100 and 400. In coupler 600, the power laser beam emitted from incoming fiber 102 is being coupled into one outgoing fiber 104 and at least one outgoing fiber 106-1. Utilization of multiple beam splitters to provide multiple split beam portions for injection into multiple outgoing fibers 106-1, . . . ,106-N is described in greater detail below. It is noted that the requisite end preparation of each fiber is not illustrated in FIG. 5 though it is nonetheless required. Thus, the power laser beam emanates from fiber 102 as an emitted beam portion 602 and is collimated by a plano-convex lens 604 into a collimated beam portion 606. That collimated portion is focussed, as a focussed portion 608, by a plano-convex lens 610 onto the lens focal point 612. The beam expands beyond focal point 612 into an expanding portion 614 until intercepted by a plano-convex lens 616 which collimates the expanded beam into a collimated beam portion 618. Collimated portion 618 has a larger diameter than collimated portion 606 and therefore a smaller divergence than beam portion 606. Collimated portion 618 is split by a splitter 620-1 into collimated split beam portions 622 and 624-1. As can be seen in FIG. 5, split portion 624-1 is applied to a focussing lens 626-1 which focuses that split portion as a focussed portion 628-1 onto the end of fiber 106-1 for injection into that fiber and continued transmission therethrough. Since the original collimated beam 606 was expanded before splitting, split beam portion 624-1 has a reduced divergence and, as a result and in accordance with the above described advantages of beam expansion, a smaller focussed spot can be achieved by lens 626-1 in focussing the split portion onto the fiber 106-1 end. In the case where coupler 600 is constructed to include only a single beam splitter 620-1, split portion 622 would be focussed by a lens 630, as a focussed portion 632, onto the end of fiber 104 for injection into and continued transmission through that fiber. Again, collimated split portion 622 is expanded, by lenses 610 and 616, with respect to collimated portion 606 and therefore has a smaller beam divergence. As a result, split portion 622 can be focussed to a smaller spot size on the end of fiber 104. Thus in accordance with the third embodiment of the present invention, the advantages realized through beam expansion as described above with respect to the second embodiment can be practiced with equal effectiveness by expanding the initially collimated beam before splitting the beam, rather than after splitting as in the second embodiment.

As an optional feature of the third embodiment of the present invention, a plurality of splitters 620-1, . . . ,620-N may be interposed to intercept expanded collimated beam portion 618 and provide a plurality of collimated split beam portions 624-1, . . . ,624-N. Each such additional split beam portion would respectively be applied to a plano-convex focussing lens 626-1, . . . ,626-N to be focussed as focussed portions 628-1,. . . ,628-N onto the ends of the plurality of outgoing fibers 106-1, . . . ,106-N, respectively, for injection into and continued transmission through those fibers. In the case where coupler 600 is constructed to include the plurality of splitters, each splitter must be selected with a splitting ratio to provide the appropriate apportionment of energy between the respective split portions so that adequate beam energy is delivered through each outgoing fiber for the task to be performed at the remote end of the fiber. The availability of beam splitters with arbitrarily determined energy apportionment has been described hereinabove. In general, coupler 600 is constructed to position the respective axes of lenses 604, 610, 616 and 630 coaxial with the fiber 102 and 104 ends about an axis 634. Further, the axis of each lens 624-1, . . . ,624-N is coaxial with its respective fiber 106-1, . . . ,106-N end about an axis 636-1, . . . ,636-N. Each axis 636-1, . . . ,636-N is perpendicular to axis 634. Further, each splitter 620-1, . . . ,620-N is positioned with the major faces thereof at an angle of 45° to axis 634.

Figures 6, 7C:
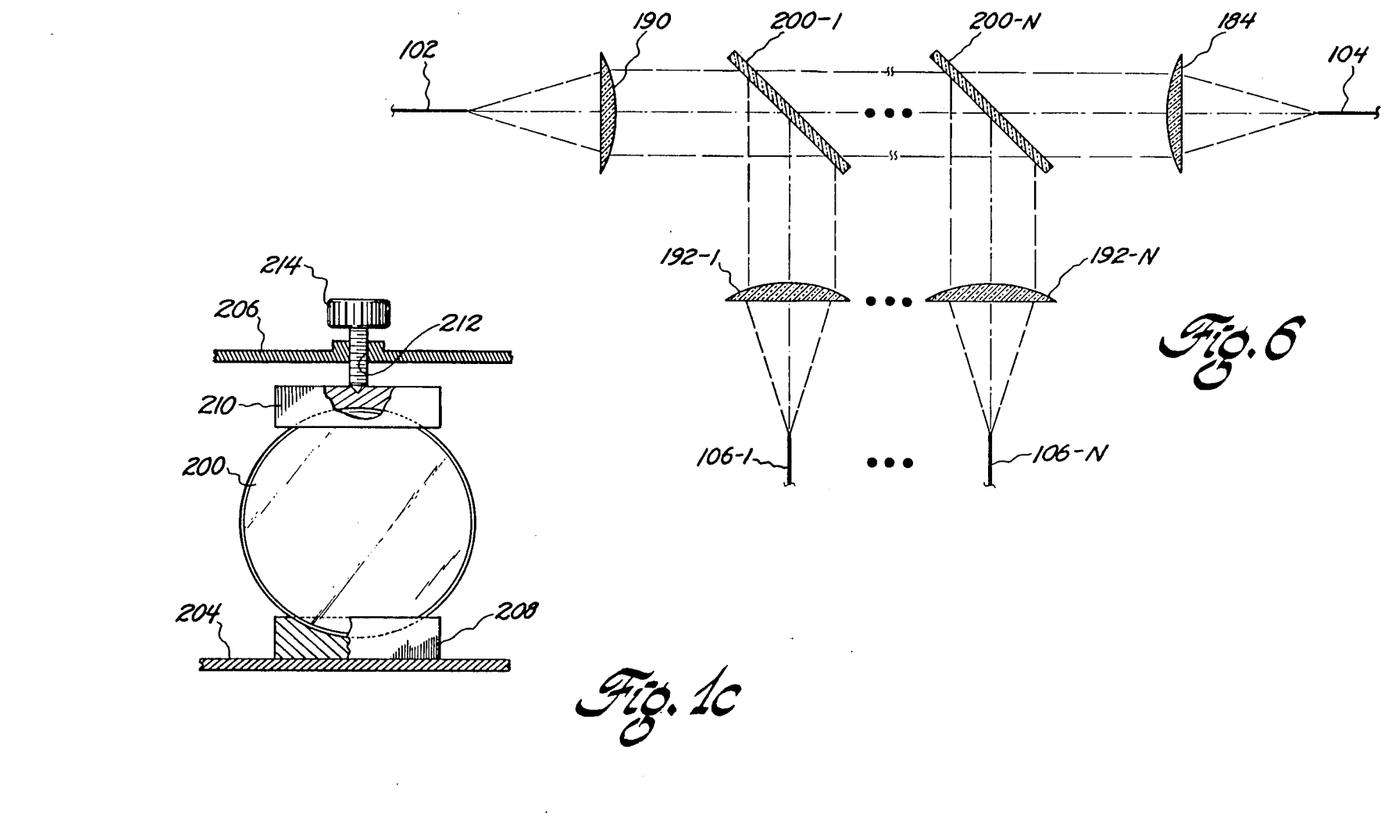
FIG. 6 schematically illustrates an optical fiber coupler constructed by modifying the coupler of the first embodiment of the present invention to include multiple beam splitters.

As illustrated and described with respect to the third embodiment of the present invention, multiple beam splitters can be utilized to increase the number of outgoing fibers into which the beam initially delivered by the incoming fiber is coupled. Thus, the first embodiment of the present invention can be modified to introduce multiple beam splitters to split the collimated beam into multiple split beam portions for injection into multiple outgoing fibers 106-1; . . . ,106-N. This modification of the first embodiment coupler is illustrated in FIG. 6 in which the reference numerals of the lenses and splitter as illustrated in FIGS. 1a and 2 have essentially been retained. While in FIGS. 1a and 2 a single focussing lens 192 was used to focus the split portion provided by the single beam splitter 200 onto the end of the single outgoing fiber 106, the use of multiple splitters and corresponding focussing lenses is illustrated in FIG. 6 by providing multiple splitters 200-1, . . . ,200-N with corresponding focussing lenses 192-1, . . . ,192-N focussing into respective outgoing fibers 106-1, . . . ,106-N. The detailed construction of the coupler illustrated in FIG. 6 will be readily apparent to those skilled in the art in view of the above description provided for coupler 100 illustrated in FIGS. 1a, 1b, 1c and 2. While not explicitly illustrated herein, it will now also be apparent to those skilled in the art that coupler 400 (FIGS. 3 and 4) constructed in accordance with the second embodiment of the present invention can be modified to provide multiple beam splitters between lenses 418 and 424 therein to provide multiple split beam portions for injection into multiple outgoing fibers.

Figure 7:
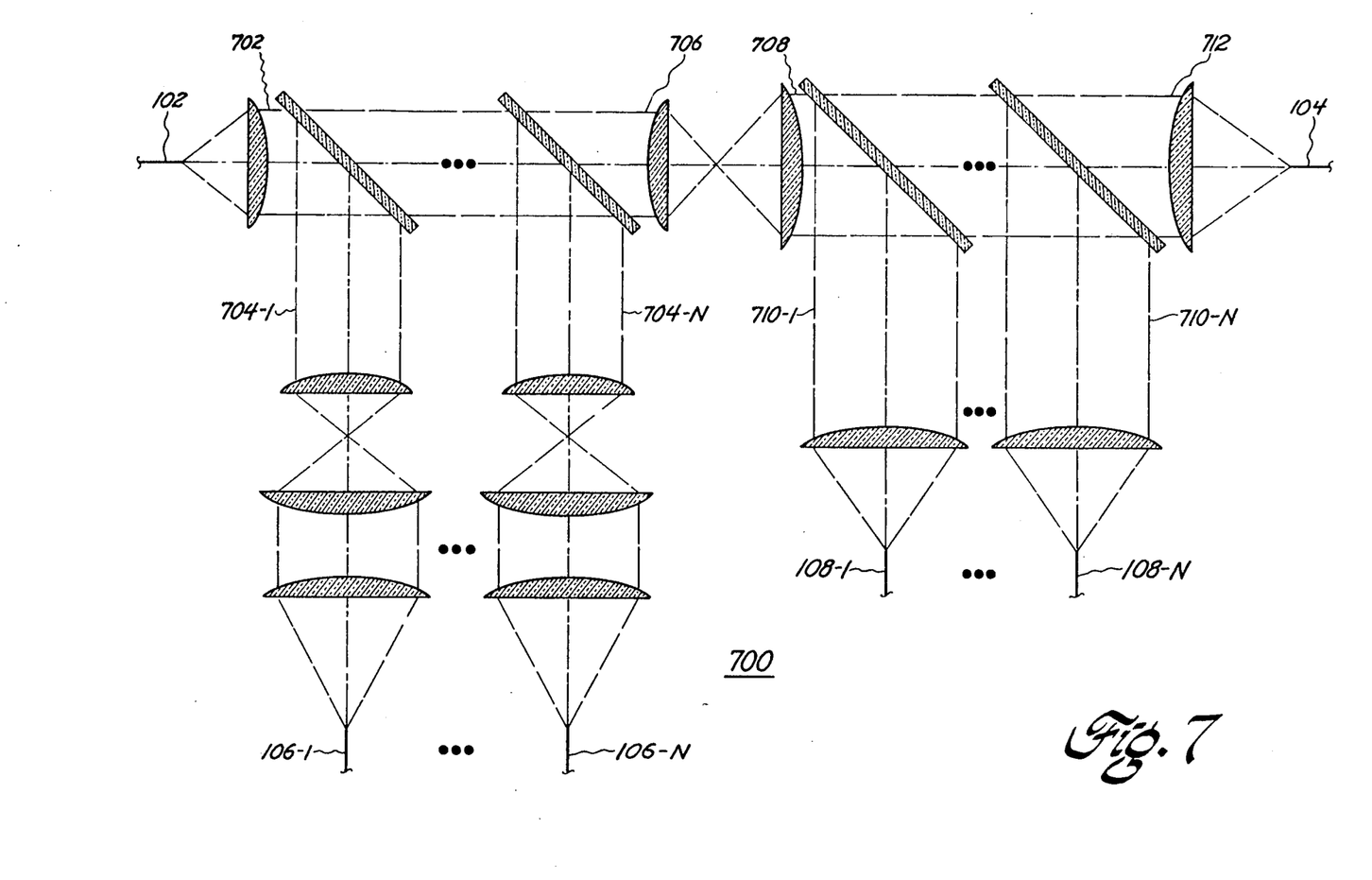
FIG. 7 schematically illustrates an optical fiber coupler constructed in accordance with a fourth embodiment of the present invention.

The teachings of the second embodiment of the present invention as illustrated in FIGS. 3 and 4 and the third embodiment as illustrated in FIG. 5 may be combined to provide a coupler 700 constructed in accordance with a fourth embodiment and illustrated in FIG. 7. There, the beam emitted from incoming fiber 102 is collimated as a collimated portion 702 which is then split into multiple split beam portions 704-1, . . . ,704-N, those portions ultimately being injected into multiple outgoing fibers 106-1, . . . ,106-N. A remaining collimated split beam portion 706 undergoes expansion into an expanded collimated beam portion 708 which is then split into multiple split beam portions 710-1, . . . ,710-N which are injected into additional outgoing fibers 108-1, . . . ,108-N. A remaining collimated split beam portion 712 from the last beam splitter is focussed for injection into outgoing fiber 104. It is understood that while the expansions of split beam portions 704-1, . . . ,704-N and portion 706 are not described in detail, the criteria for selecting the lenses to effect those expansions are as described hereinabove with respect to the second embodiment of the present invention. It is noted that, optionally, both couplers 600 and 700 can be provided with photodiodes in the manner and for the purpose described above with respect to coupler 100.

Figures 8A, 8B:
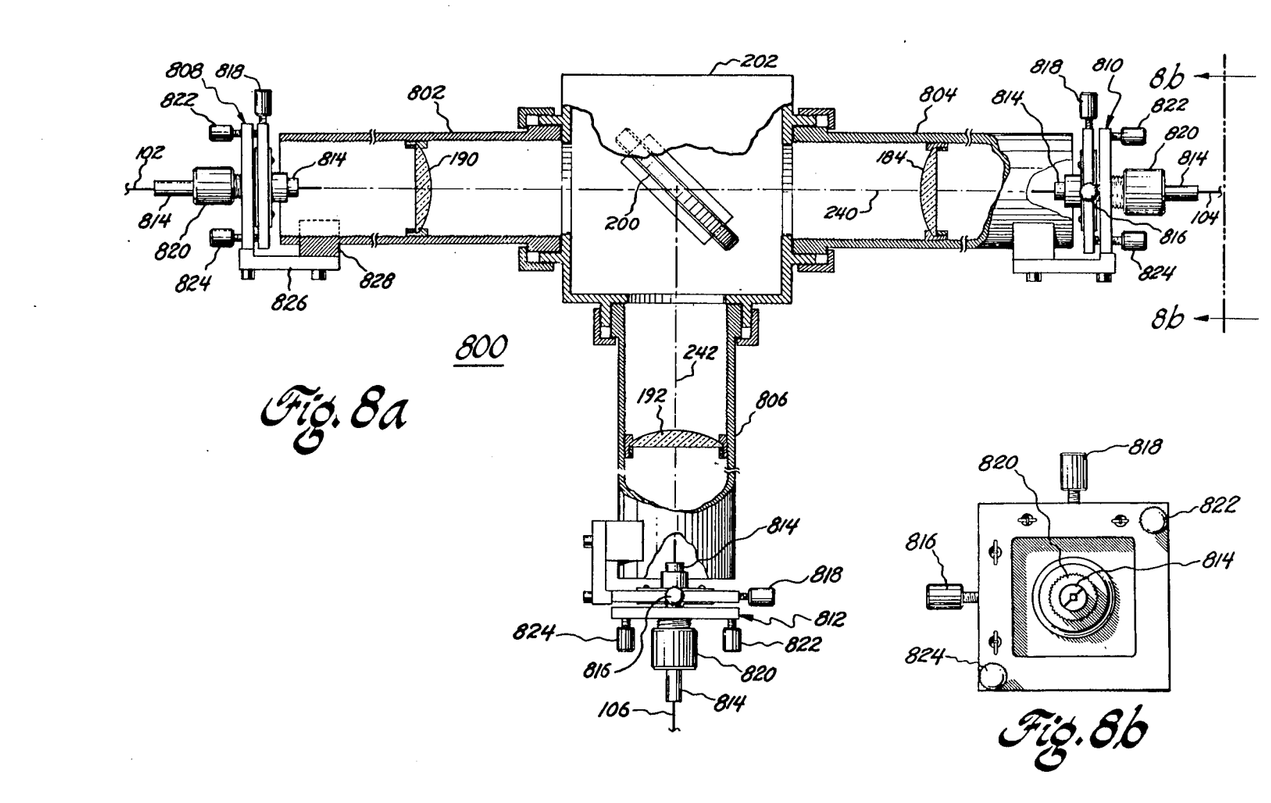
FIGS. 8a and 8b illustrate an optical fiber coupler constructed by modifying the coupler of the first embodiment of the present invention to incorporate multiaxis adjustable fiber holders.

The couplers illustrated and described hereinabove require rigid mounting of the optical fibers in the split fiber holder shown in FIGS. 1 and 3. Such rigid mounting requires precise construction of the coupler in order to achieve the requisite alignment of fibers to enable efficient beam injection. The invention is, however, not so limited. FIG. 8a illustrates a coupler 800 which is coupler 100 of the first embodiment of the present invention modified to include a multi-axis adjustable fiber holder at the end of each barrel portion. For clarity, the reference numerals of the lenses, splitter and splitter enclosure of coupler 100 have been retained for coupler 800. Thus, coupler 800 comprises three barrel portions 802, 804 and 806 at the respective ends of which are mounted adjustable optical fiber holders 808, 810 and 812 for respectively supporting the ends of fibers 102, 104 and 106. Each fiber holder is preferably provided as a Model No. 07 HFO 002 fiber holder manufactured by Melles Griot of Irvine, Calif. The holder is further illustrated in an end view thereof in FIG. 8b which is section 8b—8b of FIG. 8a. Each fiber 102, 104 and 106 is supported in a split half holder 814 which is in turn held within a central bore of its respective fiber holder. Each split half holder is cylindrical in cross section and preferably fabricated of quartz. As seen in FIG. 8b, the two split halves of the split half holder when aligned form a groove of approximately square cross section. The groove has a width and depth selected such that when a fiber lies in the groove sandwiched between the split halves, the faces of the split halves do not touch. This mode of support is analogous to that achieved in split holder 138 (FIGS. 1a and 1b) in which opposing faces 154 and 156 of the base and cap, respectively, do not make contact with fiber 102 in place. Still referring to FIGS. 8a and 8b, split half holder 814 is held in the fiber holder central bore by set screws, not shown. Each split half holder is positioned along the fiber away from the end thereof to assure no impingement of the power laser beam thereon. As described above, the provision of the split holder fabricated of quartz, which is substantially laser beam transparent, obviates any potential burning problem otherwise resulting from laser impingement. Each fiber holder has fluted alignment knobs 816, 818 and 820 for adjustment in three mutually orthogonal directions of the fiber held therein. Additional adjustment knobs 822 and 824 enable adjustment about two tilt axes. Thus, provision of fiber holders 808, 810 and 812 enables precise alignment of the ends of fibers 102, 104 and 106 to assure efficient coupling of the power laser beam therebetween. It is noted that the ability to achieve precise alignment between fiber ends substantially eliminates the possibility of the power laser beam impinging on fiber supporting elements. As a result, each split holder could be fabricated of a material other than quartz, e.g. plexiglass.

Still referring to FIGS. 8a and 8b, fiber holder 808 is bolted to one end of a base plate structure 826. A bracket 828 is rigidly affixed to barrel portion 802 and bolted to the opposite end of plate 826. In similar fashion, fiber holders 810 and 812 are bolted to base plate structures which are in turn affixed to barrel portions 804 and 806, respectively. Each bracket, such as bracket 828, may be affixed, such as by bolting, to its barrel portion or formed as an integral part of the barrel during barrel fabrication. Alignment between fibers 102, 104 and 106 to achieve efficient coupling is accomplished by initial adjustment of the fiber end positions, using optical fiber holders 808, 810 and 812, while transmitting a low power laser beam, e.g. a helium-neon laser beam, or a high power laser beam operated at low power. It is noted that the above described optional photodiodes and associated detector circuit may be installed with equal effect for practice with device 800, though this is not shown in FIG. 8a. In such a case, the photodiodes can be mounted on the face of each fiber holder.

While coupler 400 is illustrated and described hereinabove as expanding split beam portion 506 prior to fiber injection and coupler 700 is similarly illustrated and described as expanding split beam portions 704-1, . . . ,704-N, the invention is not so limited. In accordance with the discussion hereinabove with respect to the second embodiment of the present invention, beam expansion reduces the beam divergence to enable achievement of a smaller focussed spot size. However, in accordance with the first embodiment of the present invention, the incoming beam quality and respective diameters of the fibers being coupled may enable injection into the outgoing fiber(s) without beam expansion. Thus, in each coupler illustrated and described herein, it may be unnecessary to expand each split beam portion, prior to fiber injection, and the need for such expansion should be evaluated in accordance with the criteria taught hereinabove.

It is noted that in general with respect to the optical fiber couplers constructed in accordance with the present invention, the total energy of the incoming beam is accounted for by the beam energies associated with the respective split beam portions coupled into the outgoing fibers and by losses at the coated optical surfaces, i.e. lenses and splitter(s), within the coupler. The losses experienced at such coated optical surfaces are on the order of approximately 0.5% per surface. It can thus be observed that the incoming beam energy is equal to the sum of the respective split beam energies of the split portions plus the energy losses experienced at optical surfaces within the coupler.

While the couplers of the present invention illustrated and described hereinabove comprise cylindrically shaped structures, the invention is not so limited. The various fiber supporting structures as well as the lenses for focussing, collimating or expanding the laser beam and the beam splitter(s), may be mounted in any enclosure effective to provide rigid support. For example, the elements comprising the inventive coupler may instead be rigidly mounted on an optical breadboard which is in turn contained in a protective enclosure.

While with respect to the embodiments of the present invention illustrated and described hereinabove plano-convex lenses are utilized, the invention is not so limited. Any lens type or combination of lenses may be used in place of each lens illustrated herein so long as the replacement lens(es) performs the appropriate focussing, collimating or expanding function. For example, lens 424 of the second embodiment may instead be provided as a planoconcave or double concave lens which would provide a diverging beam to be collimated by lens 426.

While coupler 800 described hereinabove is provided with three multi-axis adjustable optical fiber holders to hold the three fibers being coupled, the invention is not so limited. Coupler 800 may instead be provided with only one or two holders to support one or two of the fibers, while the remaining fiber(s) are supported with the connectors and structure contained in couplers 100 and 400. A coupler provided with one or two multi-axis adjustable holders would still have substantial adjustability to achieve precise alignment between the respective ends of the fibers being coupled. Further, while only coupler 800 is described herein as including multi-axis adjustable fiber holders, any coupler constructed in accordance with the present invention may include such adjustable fiber holders.

While it is preferred herein that the lenses and splitters utilized in the construction of all embodiments of the present invention be fabricated of fused quartz, the invention is not so limited. Where it is believed the laser beam energy density to be encountered by a particular lens or splitter is sufficiently low such that the possibility of lens damage due to heating is not a concern, an ordinary glass lens may be used.

While a plate type beam splitter with a circular cross section has been illustrated and described hereinabove with respect to the various embodiments, the invention is not so limited. Other shapes of plate type beam splitters as well as other types of splitters for splitting power laser beams are known in the art and the present invention may be equally effectively practiced therewith.

While various specific embodiments comprising pluralities of lenses and one or more beam splitters have been illustrated and described hereinabove, the invention is not so limited. Other combinations of beam splitters and beam expanding lenses, within the scope of the present invention, effective to couple pluralities of power laser beam transmitting optical fibers together will now occur to those skilled in the art.

While the beam splitters utilized hereinabove are each disposed at an angle of 45° to the axis of the laser beam being split, the invention is not so limited. The invention may be practiced with equal effectiveness with the splitter oriented at an angle other than 45°, e.g. as may be required to meet a spatial constraint imposed on the coupler. It is noted that, typically, beam splitters are constructed to provide a prescribed splitting ratio at a particular angle of orientation. As a result, if an orientation angle of other than 45° is contemplated, the beam splitter would have to be constructed to perform the desired splitting ratio at that orientation angle.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for coupling into a plurality of outgoing optical fibers a high power laser beam delivered through an incoming optical fiber, comprising:
   means for splitting the high power laser beam emitted from an end of the incoming fiber into a plurality of split beam portions equal in number to the plurality of outgoing fibers;
   lens means for optically shaping the plurality of split beam portions for respective injection into the ends of the outgoing fibers;
   the respective ends of the incoming and outgoing fibers being prepared in advance for fiber coupling;
   the optical shaping performed by said lens means resulting in each said split beam portion being focussed as a spot onto a respective one of the outgoing fiber ends for injection therein such that the focussed portion of the shaped beam has an entry cone angle that is less than two times an angle corresponding to a numerical aperture of the outgoing fiber and a focussed spot size with a diameter that is less than the diameter of a core portion of the outgoing fiber; and
   means for mounting said lens means and beam splitting means in alignment with the incoming and outgoing fiber ends so that the high power laser beam emitted from the incoming fiber end is split into the plurality of split beam portions which are respectively shaped and injected into the ends of the plurality of outgoing fibers for continued transmission through the outgoing fibers.

2. The coupling apparatus of claim 1 wherein said lens means for shaping is a first lens means;
   said beam splitting means comprising:
   second lens means for collimating as a first collimated beam portion the beam emitted from the incoming fiber end; and
   at least one beam splitter for splitting the first collimated beam portion into the plurality of said split beam portions.

3. The coupling apparatus of claim 2 wherein there is only one beam splitter which splits the first collimated beam portion into two said split beam portions.

4. The coupling apparatus of claim 2, said first lens means including means for optically expanding, prior to focussing, at least one of said split beam portions into a second collimated beam portion having a larger beam diameter than the first collimated beam portion, so that a beam divergence of the second collimated beam portion is smaller than a beam divergence of the first collimated beam portion and as a result the second collimated beam portion can be focussed to a smaller focussed spot diameter corresponding to the smaller divergence of the second collimated beam portion.

5. The coupling apparatus of claim 2 wherein each said split beam portion is a second collimated beam portion having a beam diameter substantially the same as the first collimated beam portion; and
   said first lens means comprising a plurality of plano-convex lenses for focussing said second collimated beam portions respectively onto the ends of the outgoing fibers.

6. The coupling apparatus of claim 1 wherein said lens means for shaping is a first lens means;
   said beam splitting means comprising:
   second lens means for collimating as a first collimated beam portion the beam emitted from the incoming fiber end;
   means for optically expanding the first collimated beam portion into a second collimated beam portion having a larger beam diameter than the first collimated beam portion; and
   at least one beam splitter for splitting the second collimated expanded beam portion into the plurality of said split beam portions.

7. The coupling apparatus of claim 6 wherein there is exactly one beam splitter which splits the second collimated expanded beam portion into two said split beam portions.

8. The coupling apparatus of claim 1 wherein said lens means for shaping is a first lens means;
   said beam splitting means comprising:
   second lens means for collimating as a first collimated beam portion the beam emitted from the incoming fiber end;
   a first beam splitter for splitting the first collimated beam portion into a predetermined number of second collimated beam portions;
   means for optically expanding a selected one of said second collimated beam portions into a third collimated beam portion having a larger beam diameter than the second collimated beam portion; and
   a second beam splitter for splitting the third collimated beam portion into a predetermined number of fourth collimated beam portions; and
   each non-selected second collimated beam portion and each said fourth collimated beam portion comprising said plurality of split beam portions.

9. The coupling apparatus of claim 8 wherein said expanding means is a first expanding means;
   said first lens means comprising:
   second expanding means for expanding at least one of the non-selected second collimated beam portions into a fifth collimated beam portion having a larger diameter than the second collimated beam portion; and
   a plano-convex lens for focussing the fifth collimated beam portion onto the end of a corresponding one of the outgoing fibers.

10. The coupling apparatus of claim 1 wherein the beam emitted from the incoming fiber end has an incoming beam energy;
    each said split beam portion having a respective predetermined split beam energy associated therewith; and
    the incoming beam energy being equal to the sum of the respective split beam energies of the split beam portions plus energy losses experienced at optical surfaces within said coupling apparatus.

11. The coupling apparatus of claim 1 wherein the incoming and outgoing fibers are of the step-index type.

12. The coupling apparatus of claim 1 wherein said lens means comprises a plurality of optical lenses each coated with a narrow wavelength band anti-reflection coating selected to maximize transmissivity of the wavelength of the power laser beam being coupled into the outgoing fibers.

13. The coupling apparatus of claim 12 wherein each of the plurality of lenses comprising said lens means is fabricated of fused quartz.

14. The coupling apparatus of claim 1 wherein said splitting means is selected to provide a predetermined apportionment of the energy of the laser beam emitted from the incoming fiber among the plurality of outgoing fibers.

15. The coupling apparatus of claim 1 further including means, positioned approximate the end of at least one of the outgoing fibers, for detecting a laser beam radiation intensity level and providing a signal in proportion thereto;

so that detection of an increase in the detected radiation intensity level beyond a predetermined level corresponding to successful laser beam injection into the outgoing fiber end is an indication of improper injection of the outgoing fiber.

* * * * *